United States Patent [19]

King

[11] Patent Number: 4,868,439
[45] Date of Patent: Sep. 19, 1989

[54] LANCED STRIP, DYNAMOELECTRIC MACHINE, CORE, AND STATIONARY ASSEMBLY

[75] Inventor: James L. King, Holland, Mich.

[73] Assignee: General Electric Company, Fort Wayne, Ind.

[21] Appl. No.: 124,305

[22] Filed: Nov. 23, 1987

Related U.S. Application Data

[62] Division of Ser. No. 660,101, Oct. 12, 1984, Pat. No. 4,712,292.

[51] Int. Cl.⁴ .............................................. H02K 1/06
[52] U.S. Cl. .................................... 310/217; 310/42; 310/91; 310/254
[58] Field of Search ................. 310/42, 89, 91, 216, 310/217, 218, 254, 258, 259, 179, 180; 29/529, 609, 450, 605; 336/210

[56] References Cited

U.S. PATENT DOCUMENTS

| | | | |
|---|---|---|---|
| 1,795,882 | 3/1931 | Noden . | |
| 2,247,890 | 7/1941 | Reardon | 171/252 |
| 2,448,785 | 9/1948 | Dolan | 171/252 |
| 2,774,897 | 12/1956 | Matthews | 310/217 |
| 2,818,515 | 12/1957 | Dolenc | 310/57 |
| 3,159,762 | 12/1964 | Haifley | 310/217 |
| 3,283,399 | 11/1966 | Hart et al. | 29/155.57 |
| 3,577,851 | 5/1971 | Detheridge et al. | 29/596 |
| 3,807,040 | 4/1974 | Otto | 29/596 |
| 3,858,067 | 12/1974 | Otto | 310/42 |
| 3,867,654 | 2/1975 | Otto | 310/42 |
| 3,886,256 | 5/1975 | Ohuchi | 310/216 |
| 3,894,956 | 7/1975 | Whitt | 252/14 |
| 4,102,040 | 7/1978 | Rich | 310/216 |
| 4,206,624 | 6/1980 | Asai et al. | 72/131 |
| 4,208,559 | 6/1980 | Gray | 29/622 |
| 4,306,168 | 12/1981 | Peachee | 310/91 |
| 4,409,714 | 10/1983 | Cunningham | 310/42 |
| 4,423,343 | 12/1983 | Field, II | 310/218 |
| 4,521,953 | 6/1985 | King | 29/596 |
| 4,594,773 | 6/1986 | Frank | 310/89 |
| 4,613,780 | 9/1986 | Fritzsche | 310/216 |
| 4,642,884 | 2/1987 | White | 310/258 |
| 4,643,012 | 2/1987 | Wiedemann | 242/83 |

FOREIGN PATENT DOCUMENTS

| | | | |
|---|---|---|---|
| 1139815 | 1/1983 | Canada | 29/596 |
| 2706717 | 9/1977 | Fed. Rep. of Germany | 29/596 |
| 0770644 | 2/1977 | South Africa . | |

*Primary Examiner*—R. Skudy
*Attorney, Agent, or Firm*—Ralph E. Keisher, Jr.

[57] ABSTRACT

A lanced strip of generally thin ferromagnetic material adapted to be edgewise wound into a core for a dynamoelectric machine. The lanced strip has a continuous yoke section extending generally lengthwise thereof, and a plurality of teeth on the lanced strip have preselected pitch axes and extend generally laterally from the yoke section, respectively. A plurality of extensions on the lanced strip extend generally laterally from the yoke section on the pitch axes of the teeth and opposite thereto, respectively.

A dynamoelectric machine, a core, a stationary assembly are also disclosed.

44 Claims, 8 Drawing Sheets

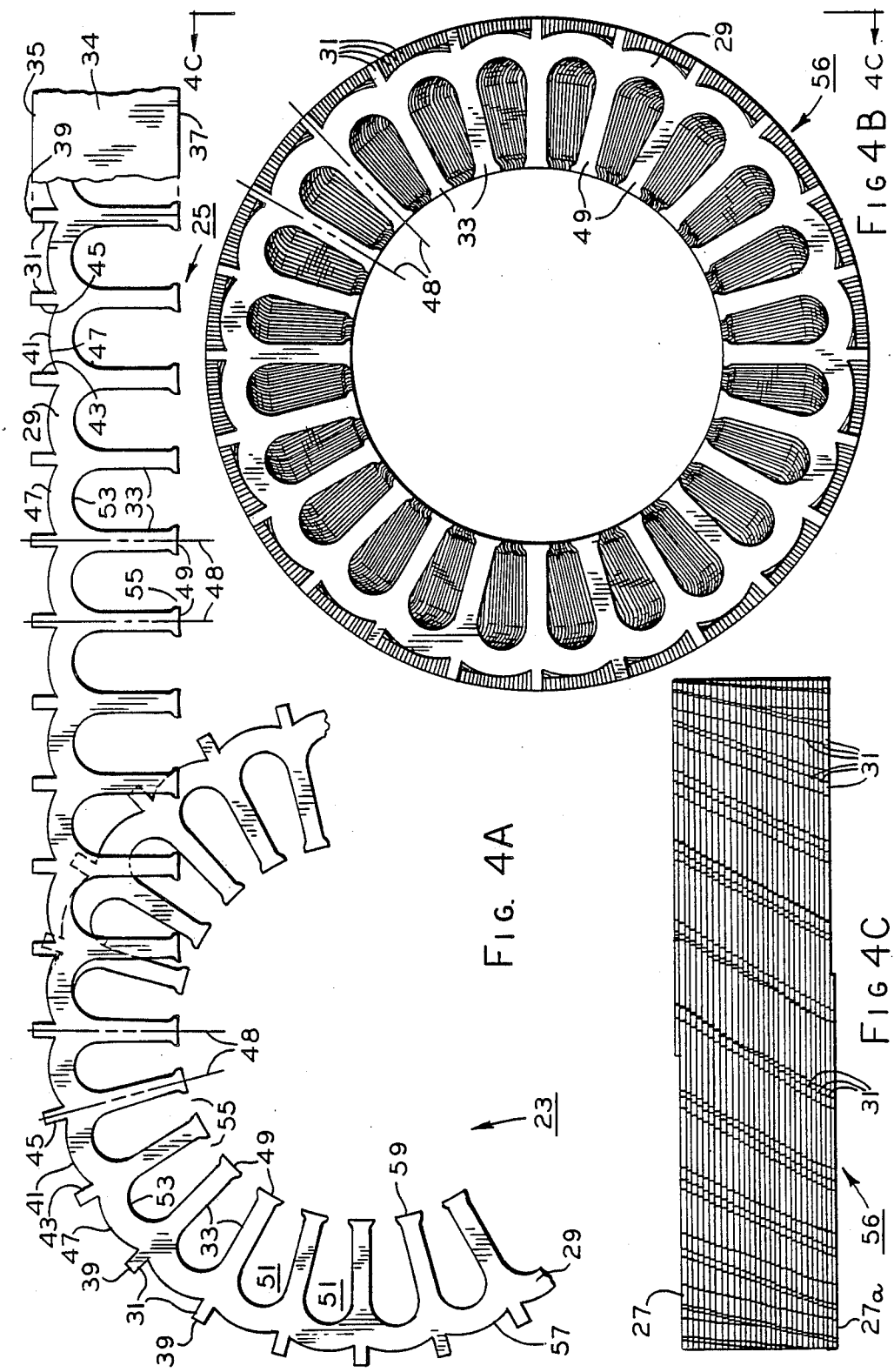

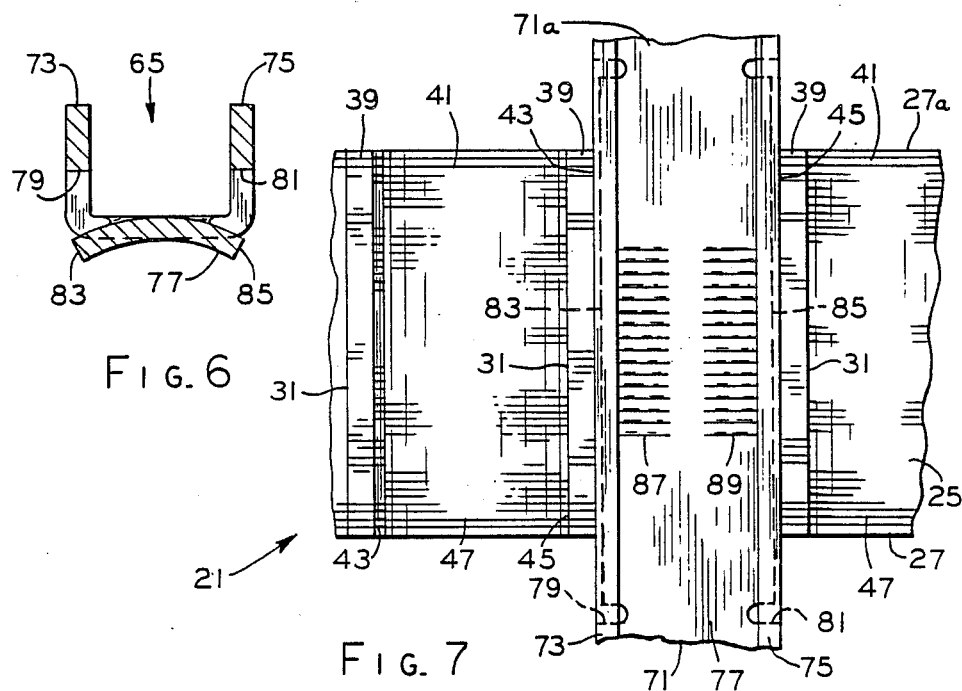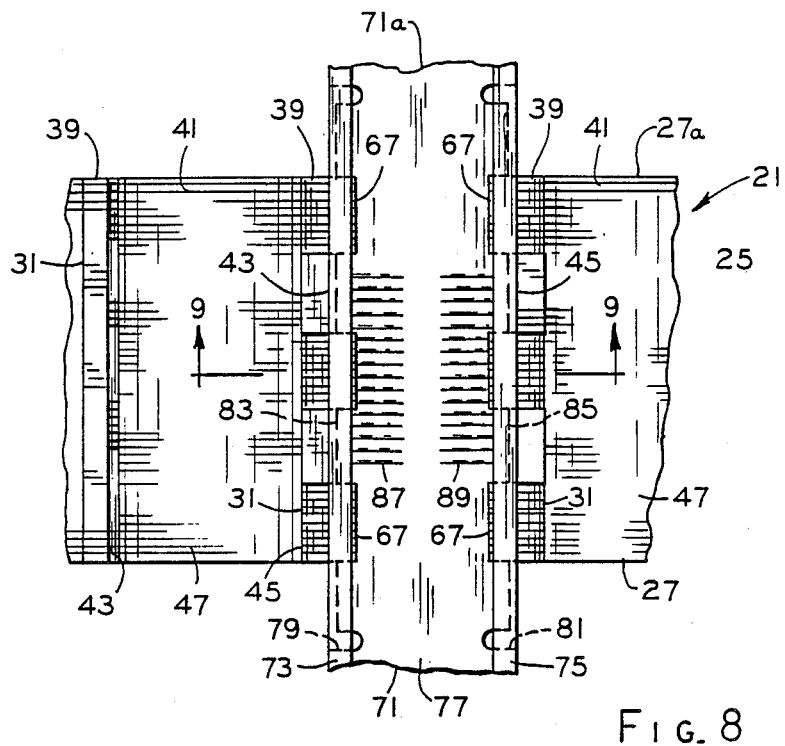

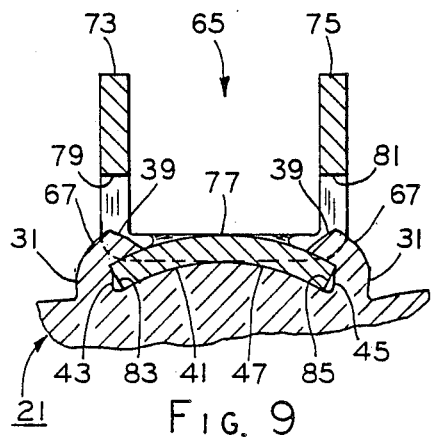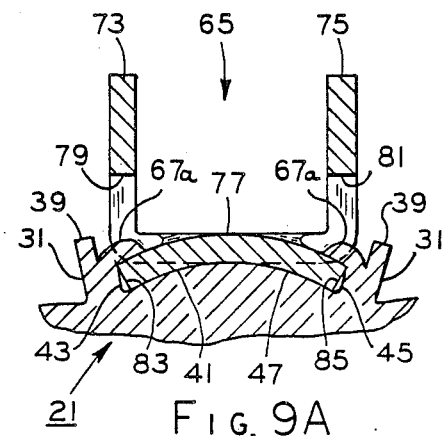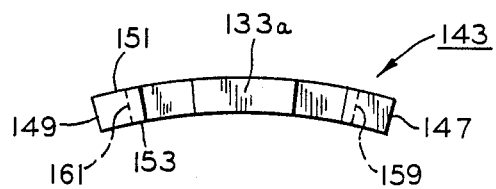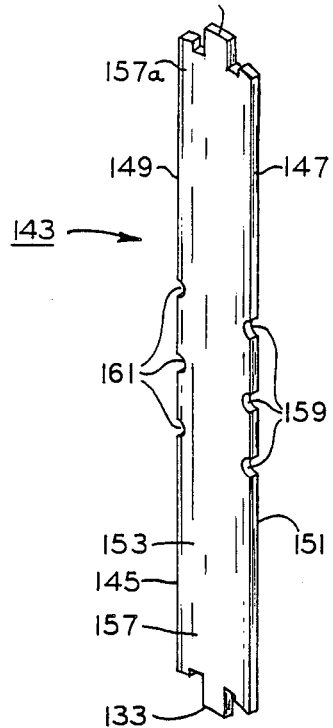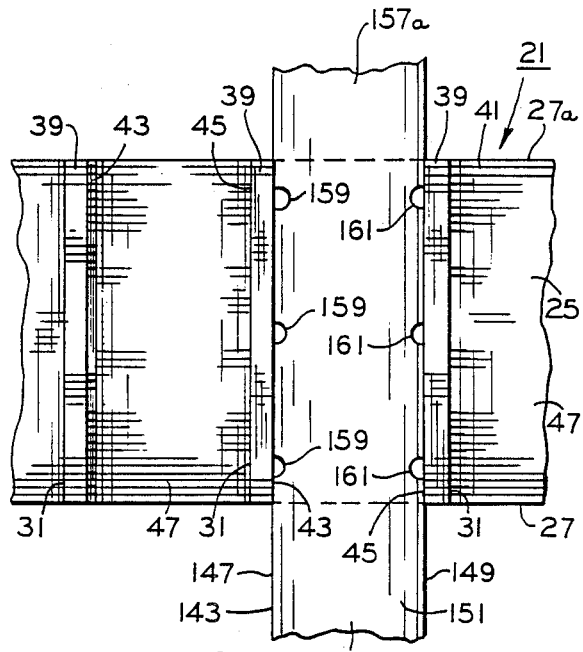

1

LANCED STRIP, DYNAMOELECTRIC MACHINE, CORE, AND STATIONARY ASSEMBLY

CROSS-REFERENCE TO RELATED APPLICATIONS

This application is a division of copending, commonly assigned, parent application Ser. No. 660,101, filed Oct. 12, 1984 and is related to the following listed, commonly assigned applications with such related and parent applications being incorporated by reference herein, respectively:

(1) Application Ser. No. 660,211, filed Oct. 12, 1984 (now U.S. Pat. No. 4,613,780 issued Sept. 23, 1986) of Harold L. Fritzsche entitled "Lanced Strip, Core, Method Of Forming Such Core, And Apparatus"; and (2) Application Ser. No. 660,116 filed Oct. 12, 1984 (now U.S. Pat. No. 4,643,012 issued Feb. 17, 1987) of Gustave F. Wiedemann entitled Apparatus And Methods For Forming Edgewise Wound Cores.

FIELD OF THE INVENTION

This application relates in general to electrical apparatus and in particular to a dynamoelectric machine, lanced strip adapted to be edgewise wound into a core for a dynamoelectric machine, an edgewise wound core for a dynamoelectric machine.

BACKGROUND OF THE INVENTION

In the past, various different cores or stators have been provided for dynamoelectric machines of various different constructions, and such cores have been formed in various different manners. For instance, in some of the past dynamoelectric machine constructions, the core thereof was formed of a plurality of generally rectangular stacked laminations of a generally thin ferromagnetic material, and in other dynamoelectric machine constructions, a lanced strip of such generally thin ferromagnetic material was edgewise and helically wound into a plurality of helical convolutions thereof having a preselected stack height thereby to form an edgewise wound core.

In the past dynamoelectric machine construction having a core formed of the rectangular stacked laminations, a bore was provided through such stacked lamination core in spaced relation from the corner sections thereof, and a set of grooves were provided in such corner section of the stacked lamination core extending generally axially across the circumferential surface thereof, respectively. A set of beams were disposed in the grooves at the corner sections of the stacked lamination core with opposite end portions on the beams extending beyond opposite end faces of the stacked lamination core, and the beams were deformed into displacement preventing engagement with the stacked lamination core thereby to secure the beams in the grooves therefor in the stacked lamination core, respectively. It is believed that the mass of the stacked lamination core between the corner sections and the bore thereof was great enough to obviate distortion of the bore and the teeth of the core in part defining such bore in response to forces applied onto the beams to effect the aforementioned deformation thereof into the displacement preventing engagement with the stacked lamination core. A pair of opposite end frames were attached to the opposite ends of the beams in spaced relation with the opposite end faces of the stacked lamination core, and of course, a rotatable assembly was associated with the stacked lamination core so as to extend through the bore thereof with opposite parts of the rotatable assembly being journaled in the opposite end frames carried by the beams secured to the stacked lamination core. One of the past dynamoelectric machine constructions utilizing a stacked lamination core with beams secured thereto, as discussed above, is shown in the Charles W. Otto U.S. Pat. No. 3,869,654 issued Feb. 18, 1975.

One of the advantages involved in utilizing a past one of the edgewise wound cores in the past dynamoelectric machine constructions instead of the past generally rectangular stacked lamination cores was, of course, the economy of the ferromagnetic material. For instance and as previously mentioned with respect to the formation of such past edgewise wound cores, the continuous lanced strip of generally thin ferromagnetic material was edgewise and helically wound into the stack of generally helical convolutions thereof to define such an edgewise wound core. Since the lanced strip was formed into helical convolutions thereof, the stack of such helical convolutions in the edgewise wound core was generally annular in shape having a generally radially thin and round yoke section with a plurality of teeth extending generally radially inwardly therefrom to define in part a bore which extended generally axially through the stack of helical convolution of the lanced strip. Since the edgewise wound core formed from the continuous lanced strip was generally annular in shape, such edgewise wound core was, of course, devoid of the corner sections embodied in the above discussed generally rectangular stacked lamination core; therefore, the aforementioned economy of ferromagnetic material between the past edgewise wound core with respect to the past generally rectangular stacked lamination core was effected. However, at least one of the disadvantageous or undesirable features of such past edgewise wound cores is believed to have involved the problem of securing a beam to the yoke section of the past edgewise wound core generally at the circumferential surface thereof without distorting the bore of the edgewise wound core or the teeth thereof defining in part such bore.

SUMMARY OF THE INVENTION

Among the several objects of the present invention may be noted the provision of an improved lanced strip of a generally thin ferromagnetic material adapted to be edgewise wound into an edgewise wound core for a dynamoelectric machine, an improved dynamoelectric machine, an improved edgewise wound core for a dynamoelectric machine, edgewise and a dynamoelectric machine, and an improved method of; the provision of such improved lanced strip in which a plurality of teeth and extensions extened oppositely from a continuous yoke section of the lanced strip on pitch axis of the teeth; the provision of such improved dynamoelectric machine, edgewise wound core and stationary assembly in which the extensions and teeth on the pitch axes therefor define the radially thickest and strongest sections of the edgewise wound core; the provision of such improved dynamoelectric machine, edgewise wound core and stationary assembly in which the lanced strip is edgewise and helically wound to form the edgewise wound core with the teeth and the extensions on the yoke section extending generally radially inwardly and outwardly therefrom in radial alignment, respectively;

the provision of such improved dynamoelectric machine, edgewise wound core and stationary assembly in which the teeth and extensions on the yoke section extend generally in spaced apart row formations between a pair of opposite end faces of the core; respectively; the provision of such improved dynamoelectric machine and stationary assembly in which at least one beam is retained against displacement from a preselected assembly position on the core between adjacent ones of the extensions; and the provision of such improved dynamoelectric machine and stationary assembly in which sets of means are deformed from the circumferential portion of the core into engagement with confronting parts of the at least one beam for retaining the at least one beam against displacement from a preselected assembly position thereof at least adjacent the circumferential portion of the core, respectively; the provision of such improved dynamoelectric machine, stationary assembly in which the at least one beam is provided with means therein for receiving the retaining means deformed from the core, respectively; and the provision of such improved lanced strip, edgewise wound core, dynamoelectric machine, stationary assembly and core in which the component parts utilized therein are simple in design, easily assembled and economically manufactured. These as well as other objects and advantageous features of the present invention will be in part apparent and in part pointed out hereinafter.

In general and in one form of the invention, a dynamoelectric machine has at least one end frame and a core including a pair of opposite end faces, a circumferential portion on the stator core between the opposite end faces thereof, and a set of grooves in the circumferential portion of the core between the opposite end faces thereof, respectively. A set of beams is disposed in part within at least some of the grooves in preselected assembly positions and have at least another part extending beyond one of the opposite end faces of the core in mounting association with the at least one end frame, respectively. The core further includes a plurality of sets of means deformed from the circumferential portion of the core at least adjacent the at least some grooves into gripping engagement with confronting parts on the beams for retaining the beams against displacement from the preselected assembly positions thereof, respectively. A rotatable assembly associated with the stator core is journaled at least in the at least one end frame.

Further in general, a core for a dynamoelectric machine is provided in one form of the invention. The core comprises a spirally wound strip of ferromagnetic material having a pair of opposite end faces and defining therebetween a yoke section. A plurality of teeth and a plurality of extensions on the strip extending generally oppositely and radially from the yoke section and also generally transversely thereof between the opposite end faces, and the extensions are arranged generally in radial alignment with respective ones of the teeth, respectively.

Still further in general and in one form of the invention, a stationary assembly for a dynamoelectric machine is provided with a core including a circumferential portion interposed between a pair of opposite end faces of the core. At least one beam is arranged in a preselected assembly position with respect to the core at least adjacent the circumferential portion thereof, and the core further includes a set of means deformed from the circumferential portion of the core into gripping engagement with confronting parts of the at least one beam for retaining the at least one beam against displacement from the preselected assembly portion thereof, respectively.

Yet further in general and in one form of the invention, a lanced strip of generally thin ferromagnetic material is adapted to be edgewise wound into a core for a dynamoelectric machine. The lanced strip has a continuous yoke section extending generally lengthwise thereof, and a plurality of teeth on the lanced strip extend on preselected pitch axes generally laterally from the yoke section, respectively. A plurality of extensions on the lanced strip extend generally laterally from the yoke section on the pitch axes of the teeth generally opposite thereto, respectively.

BRIEF DESCRIPTION OF THE DRAWINGS

FIG. 4A is a top elevational view of the core of FIG. 3, and the lanced strip of FIG. 4 is shown extending from the core as a comparison with respect to the shape of the lanced strip upon the edgewise deformation thereof into the core and to illustrate principles which may be practiced in a method of forming an edgewise wound core;

FIG. 4B is a top elevational view of a helical convolution stack of the deformed lanced strip during an initial stage of the formation of the core shown in FIG. 4A;

FIG. 4C is a side elevational view of the helical convolution stack of FIG. 4B;

FIG. 6 is a sectional view taken along lines 6—6 in FIG. 5;

FIG. 7 is a partial top elevational view of the core of FIG. 3 showing the beam of FIG. 5 associated in a preselected assembly position therewith;

FIG. 8 is generally the same as FIG. 7 but showing sections of adjacent extensions on the core deformed into displacement preventing engagement with the beam in its preselected assembly position;

FIG. 9 is a sectional view taken along 9—9 in FIG. 8;

FIG. 9A is generally the same as FIG. 6 illustrating an alternative deformation of the adjacent extensions in one form of the invention;

FIG. 10 is a perspective view of an alternative beam which may be utilized with the core of FIG. 3 in one form of the invention;

FIG. 11 is an end elevational view of the alternative beam of FIG. 10;

FIG. 12 is a top elevational view of the core of FIG. 3 showing the alternative beam of FIG. 10 associated in a preselected assembly position therewith;

Corresponding reference characters refer to corresponding parts throughout the several views of the drawing.

The exemplifications set out herein illustrate the preferred embodiments of the invention in one form thereof, and such exemplifications are not to be construed as limiting either the scope of the disclosure or the scope of the invention in any manner.

DETAILED DESCRIPTION OF THE PREFERRED EMBODIMENTS

Figure 1:
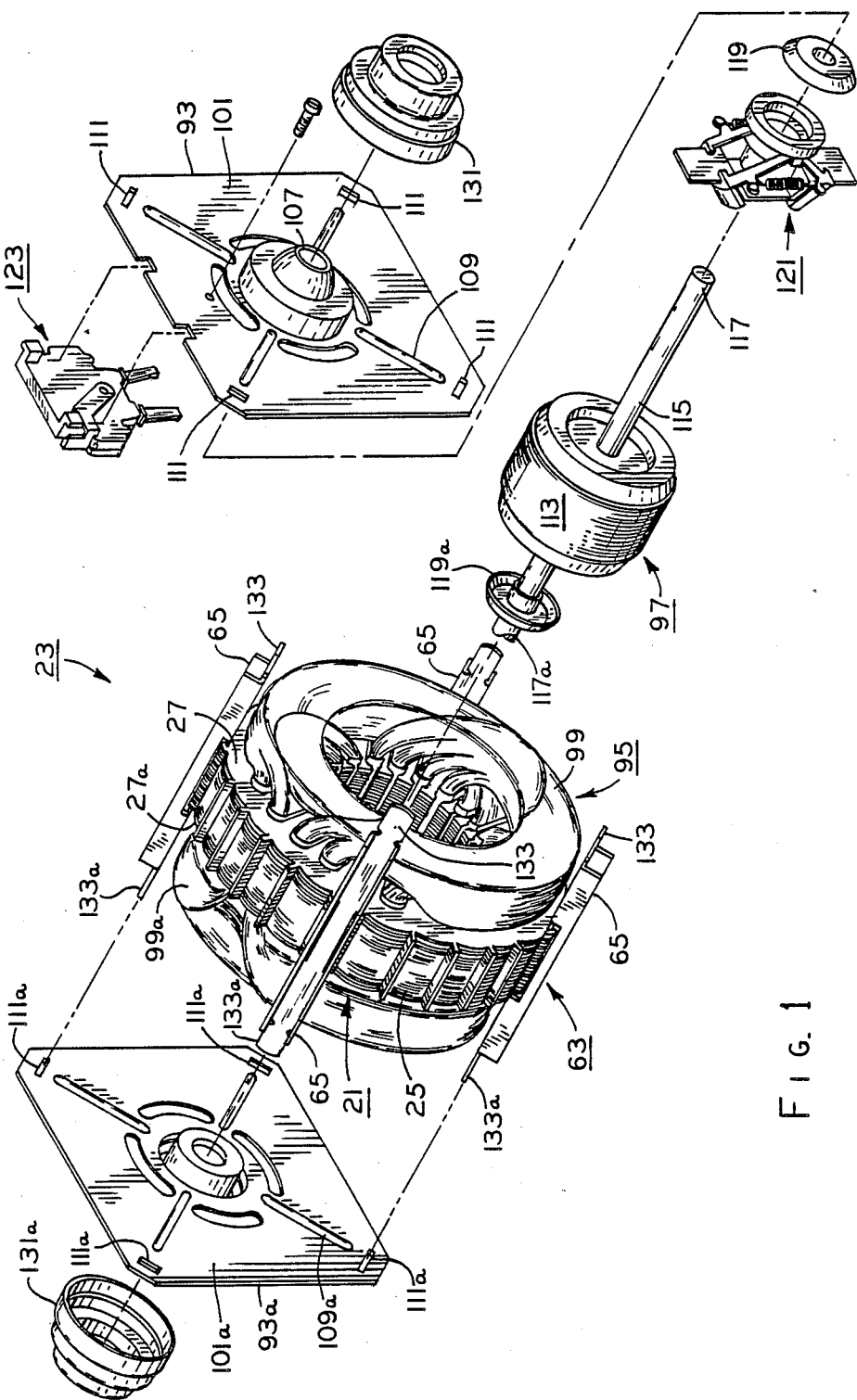
FIG. 1 is an exploded perspective view showing a dynamoelectric machine in one form of the invention and illustrating principles which may be practiced in a method of assembling a stationary assembly for a dynamoelectric machine.
Figure 2:
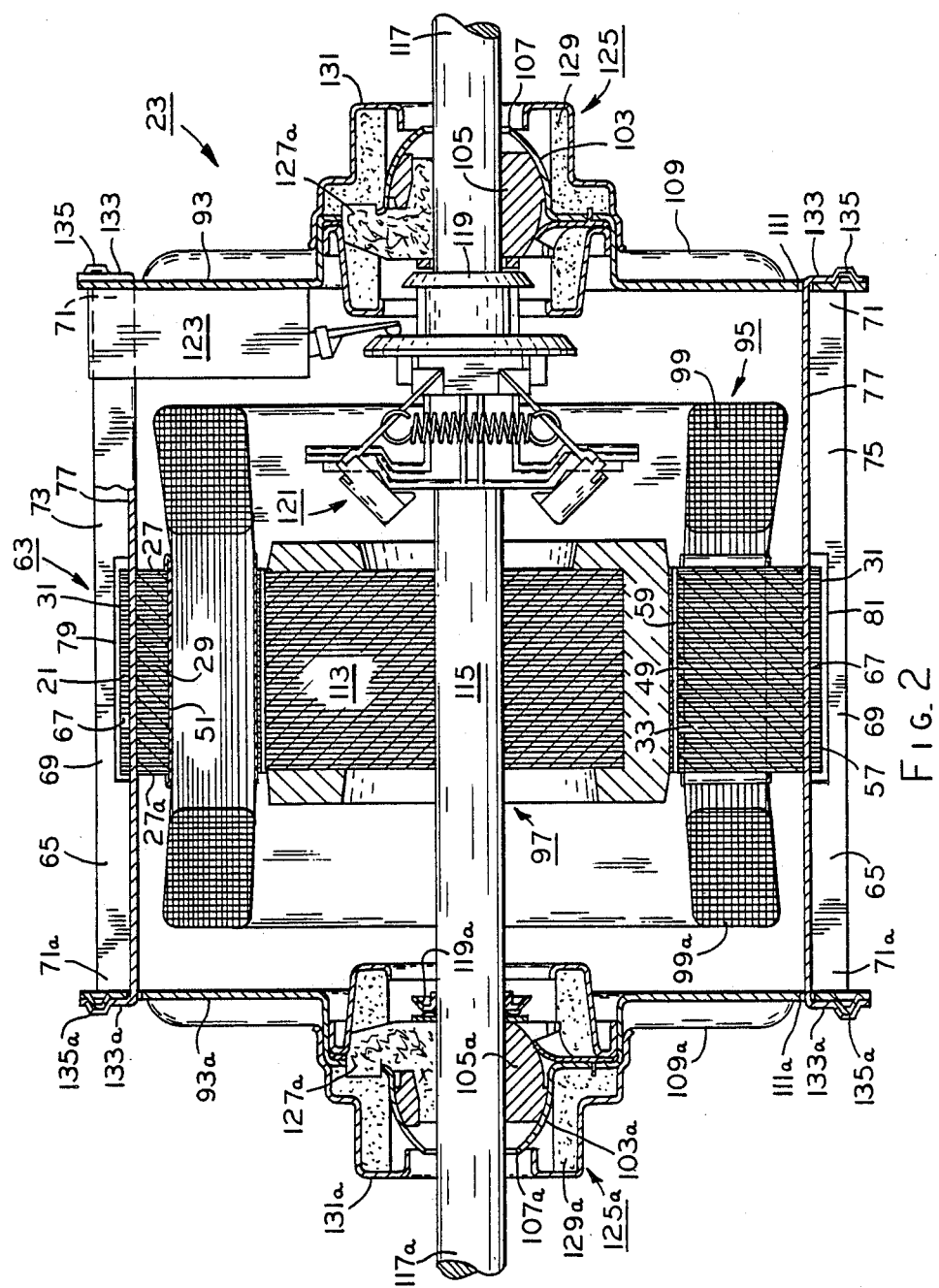
FIG. 2 is a sectional view showing the dynamoelectric machine of FIG. 1 in cross section.
Figure 3:
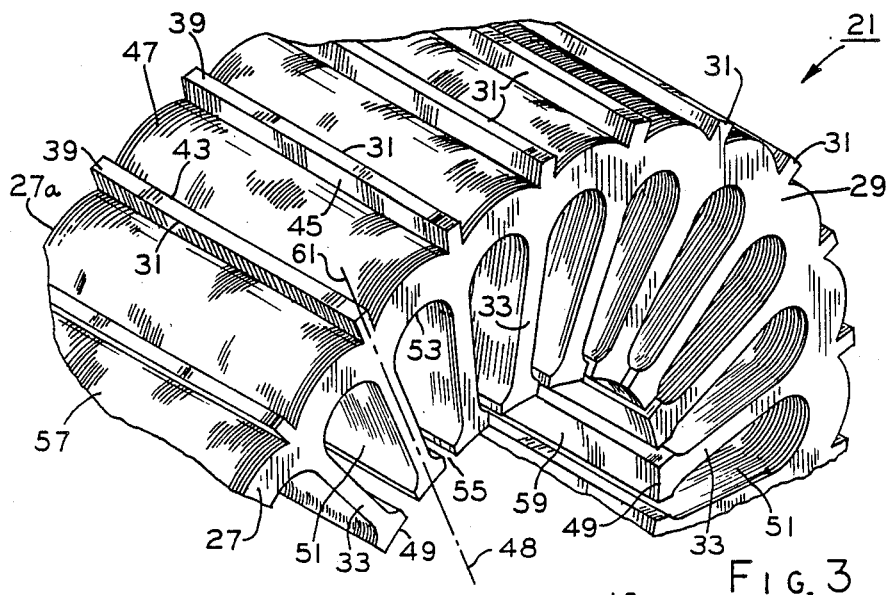
FIG. 3 is an enlarged partial perspective view of a core in one form of the invention utilized in the stationary assembly of FIG. 1 with the winding means omitted for clarity.

With reference now to the drawings in general, there is shown in one form of the invention an edgewise wound core 21 for a dynamoelectric machine 23 (FIG. 1). Core 21 is formed of a spirally or helically wound lanced strip 25 of generally thin ferromagnetic material having a pair of opposite end faces 27, 27a with a yoke or yoke section 29 therebetween (FIGS. 1–3). A plurality of extensions 31 and a plurality of teeth 33 on lanced strip 25 extend generally oppositely and radially from yoke section 29 and generally in row formation between opposite end faces 27, 27a of core 21, respectively, and the extensions are arranged generally in radial alignment with respective ones of the teeth (FIG. 3).

More particularly and with specific reference to FIG. 4, lanced strip 25 may be lanced or otherwise formed by suitable means well known to the art, such as progressive dies or the like for instance, from a strip stock 34 of generally thin ferromagnetic material having the desired electrical characteristics and the physical properties desirable to enhance the edgewise winding of lanced strip 25 into core 21, as discussed in greater detail hereinafter. Strip stock 34 has a pair of generally parallel opposite edges 35, 37, and extensions or extension means 31 are provided on lanced strip 25 for defining a plurality of lands 39 and grooves 41 therein with the lands being defined by opposite edge 35 of strip stock 34 thereby to provide an interrupted opposite edge on the lanced strip. Grooves 41 include a pair of opposed sidewalls 43, 45 intersecting with lands 31 of adjacent ones of extensions 39, and a plurality of generally arcuate outer edges 47 on lanced strip 25 defines a scalloped shaped base wall of the grooves interposed between the opposed sidewalls thereof, respectively. It may be noted that extensions 31 and teeth 33 are disposed on or aligned generally about preselected pitch axes 48 of the teeth which have tips or tip sections 49 defined by opposite edge 37 of strip stock 34, respectively, thereby to provide an interrupted opposite edge on lanced strip 25; therefore, the dimension of the lanced strip between lands 39 and tooth tips 49 is predeterminately at least generally the same as that between opposite edges 35, 37 of strip stock 34. While extensions 31 and teeth 33 are illustrated herein as being on pitch axes 48 of the teeth, it is contemplated that the extensions may be provided on the pitch axes of only some of the teeth and also that the extensions and teeth may be of various different shapes with some of the extensions being shorter than others thereof within the scope of the invention so as to meet at least some of the objects thereof. A plurality of slots 51 are provided through lanced strip 25 at least in part between adjacent ones of teeth 33, and a plurality of arcuate inner edges 53 on the lanced strip generally opposite arcuate outer edges 47 thereof define a closed end of the slots, respectively. Although outer and inner edges 47, 53 on lanced strip 25 are discussed herein as being generally arcuate, it is contemplated that such edges may have other shapes, such as for instance respectively having opposed flat portions thereon or being entirely generally flat instead of arcuate, within the scope of the invention so as to meet at least some of the objects thereof. It may be noted that each of the plurality of sets of arcuate outer and inner edges 47, 53 on lanced strip 25 have generally the same arcuate configuration generated about the same center point with the arcuate inner edges being smoothly formed with opposed ones of the opposite side edges of teeth 33, respectively. A plurality of open ends 55 of slots 51 intersect with opposite edge 37 of strip stock 34 between adjacent ones of tooth tips 49, and the open ends of the slots are arranged generally opposite closed ends thereof, defined by inner edges 53 on lanced strip 25 respectively. Thus, lanced strip 25 generally comprises continuous yoke section 29 extending generally lengthwise or longitudinally of the lanced strip, and extensions 31 and teeth 33 on the lanced strip extend generally laterally from the yoke section with the extensions being interposed between adjacent ones of arcuate outer edges 47 so as to extend in part therebeyond and with the teeth being interposed between adjacent ones of arcuate inner edges 53, respectively. While the width of extensions 31 are illustrated herein as being less than the width of teeth 33 for purposes of disclosure, it is contemplated that the width of the extensions may be no greater than the widths of the teeth within the scope of the invention so as to meet at least some of the objects thereof.

Figure 4:
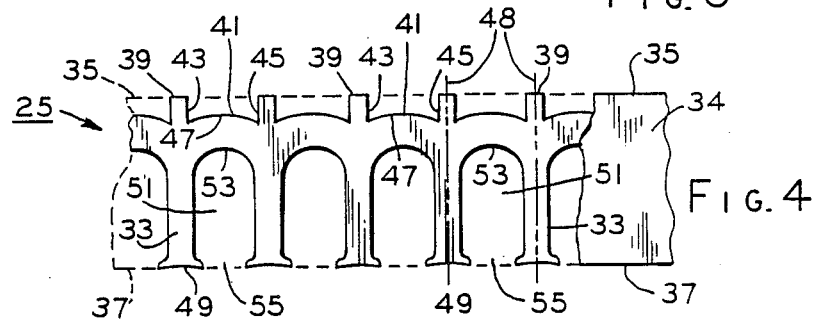
FIG. 4 is a front elevational view of a part of a lanced strip of generally thin ferromagnetic material in one form of the invention from which the core of FIG. 3 is edgewise and helically wound.

Referring again to the drawings in general and recapitulating at least in part with respect to the foregoing, there is shown a method of forming edgewise wound core 21 from strip stock 34 (FIGS. 4A–4C). In practicing this method, lanced strip 25 is lanced from strip stock 34 with the lanced strip having continuous yoke section 29, teeth 33 extending on preselected pitch axes 48, and extensions 31 on the pitch axes of at least some of the teeth and extending generally opposite thereto, respectively (FIGS. 4 and 4A). Lanced strip 25 is deformed into a stack 56 of continuous helical convolutions thereof with teeth 33 extending on their pitch axes 48 from yoke section 29 of the deformed lanced strip generally radially inwardly of helical convolution stack 56 and with extensions 31 on the pitch axes of at least some of the teeth extending from the yoke section of the deformed lanced strip generally radially outwardly of the helical convolution stack, respectively (FIGS. 4B and 4C). Extensions 31 and teeth 33 are positioned or otherwise disposed or aligned generally in axial row formation across helical convolution stack 56, respectively (FIG. 3).

More particularly and with specific reference to FIGS. 3, 4 and 4A–4C, when core 21 is formed or wound from lanced strip 25, the lanced strip is, of course, wound in an edgewise and helical or spiral fashion into the helical convolutions defining stack 56 thereof. Upon the accumulation of deformed lanced strip 25 into helical convolution stack 56, yoke section 29 of the deformed lanced strip has a generally annular configuration in the helical convolution stack with such stack having a preselected axial length or stack height as measured with respect to the centerline axis thereof, and extensions 31 and teeth 33 on the yoke section of the deformed lanced strip in the helical convolution stack thereof are generally angularly displaced from each other, as best seen in FIG. 4B and 4C. The helical convolutions of deformed lanced strip 25 in stack 56 are easily adjustable or positioned one to another thereof, and upon such adjustment or positioning, extensions 31 and teeth 33 on yoke section 29 of the deformed lanced strip are disposed or otherwise aligned generally in the aforementioned axial row formations thereof across the helical convolution stack thereby to effect the formation of core 21, as best seen in FIGS. 3 and 4A. Albeit not shown for purposes of brevity of disclosure, teeth 33 on deformed lanced strip 25 of helical convolution stack 56 may be associated in aligning relation with various different fixtures or alignment arbors or the like for instance which are well known to the art to effect the aforementioned adjustment or repositioning of the helical convolutions in the stack 56. Of course, the leading and trailing end portions of deformed lanced strip 25 in helical convolution stack 56 define opposite end faces 27, 27a of core 21.

When core 21 is so formed or edgewise wound, the sets of outer edges 47 on yoke section 29 of deformed lanced strip 25 are also aligned across core 21 thereby to define a circumferential surface 57 about the core between opposite end faces 27, 27a thereof, and the circumferential surface is, of course, interrupted by extensions 31 extending in the axial row formations thereof transversely across the core, respectively. Further, with teeth 33 arranged in the axial row formation thereof across core 21 between opposite faces 27, 27a thereof, tips 49 of the teeth define in part a bore 59 which extends generally axially through the core intersecting with the opposite end faces thereof, respectively, as best seen in FIGS. 2 and 3. Of course, open ends 55 of slots 51 intersect with bore 59 of core 21, and yoke section 29 of the core between opposite end faces 27, 27a thereof is defined generally between closed ends 53 of slots 51 and base walls 47 of grooves 41, respectively. It may be noted that extensions 31, teeth 33, grooves 41 and slots 51 are arranged generally in row formation so as to extend generally axially or transversely across core 21 between opposite end faces 27, 27a thereof and also that the teeth and extensions are predeterminately arranged so as to extend oppositely from yoke section 29 in radial alignment or relation with each other, as illustrated by a radius line or radial axis of the core indicated at 61 which represents one of pitch axis 48 of the teeth in FIG. 3. Additionally, it may also be noted that the radial dimension from the centerline axis of core 21 and lands 39 on extensions 31 is greater than any other radial dimension between the centerline axis of the core and any other part thereof. If a more detailed discussion of the winding of a lanced strip into an edgewise wound core is desired, reference may be had to the aforementioned commonly assigned patent application Ser. No. 660211.

Figure 5:
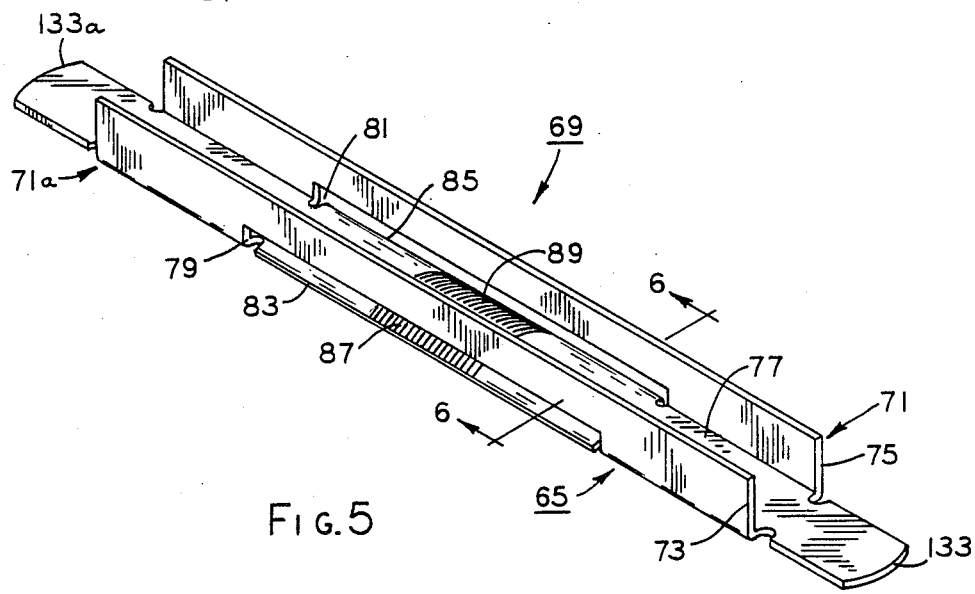
FIG. 5 is an enlarged perspective view of a beam utilized in the stationary assembly of FIG. 1 and disassociated therefrom for clarity.

With further reference to the drawings in general and recapitulating at least in part with respect to the foregoing, there is illustrated a method of assembling a stationary assembly 63 for dynamoelectric machine 23 (FIG. 1). Stationary assembly 63 includes core 21 having opposite end faces 27, 27a with circumferential portion 57 interposed therebetween and a set of beams 65 (FIGS. 1, 3 and 5). In practicing this method, beams 65 are associated in a preselected assembly position with core 21 adjacent circumferential portion 57 thereof (FIG. 7). A set of sections 67 on circumferential portion 57 of core 21 is deformed or otherwise displaced into gripping or displacement preventing engagement with beams 65, and thereby the beams are retained against displacement from the preselected assembly positions thereof, respectively (FIGS. 8 and 9).

More particularly and with specific reference to FIGS. 5 and 6, beams 65 are formed with a generally U-shaped channel including an intermediate portion or section 69 integrally interposed between a pair of opposite end portions or sections 71, 71a, and the intermediate and opposite end portions are defined at least in part by a pair of opposite sidewalls 73, 75 integrally intersecting with a cross or base wall 77, respectively. A set of generally elongate openings or slots 79, 81 extend through opposite sidewalls 73, 75 at least adjacent the intersections thereof with cross wall 77 and at least in part within intermediate portion 69 of beams 65, and a set of opposite marginal edges 83, 85 are provided on the cross wall adjacent the openings and at least in part within the intermediate portion of the beams, respectively. It may be noted that the configurations of cross walls 77 on beams 65 at least in part generally corresponds to that of base walls 47 of grooves 41 in core 21. If desired, a set of serrations 87, 89 may be provided on cross wall 77 adjacent openings 79, 81 and opposite marginal edges 83, 85 on the cross wall.

While the association of all of beams 65 with core 21 may be accomplished simultaneously, as discussed hereinafter, such association of only one of the beams, is illustrated in FIGS. 7–9 for purposes of drawing simplicity; however, it is contemplated that the beams may be associated individually or in sets thereof with the core. Beams 65 are associated in the preselected assembly positions thereof with respect to core 21 by placing intermediate sections 69 of the beams at least in part within preselected ones of grooves 41 in the core and extending opposite end portions 71, 71a of the beams generally axially beyond opposite end faces 27, 27a of the core, respectively, as best seen in FIG. 7. In this manner, a part of opposite sidewalls 73, 75 of beams 65 within intermediate portions 69 thereof are disposed at least adjacent opposed sidewalls 43, 45 of the aforementioned preselected grooves 41, and cross walls 77 of the beams within the intermediate portions thereof are seated at least in part in engagement with base walls 47 of such preselected grooves, respectively, as best seen in FIG. 9. Thus, openings 79, 81 in opposite sidewalls 73, 75 and opposite marginal edges 83, 85 on base wall 77 of beams 65 are positioned at least adjacent opposed sidewalls 43, 45 of the preselected grooves 41, respectively. With beams 65 so arranged in the preselected assembly positions thereof within the preselected grooves 41 in core 21, sections 67 of extensions 31 are deformed or otherwise bent or swedged over by suitable tooling (not shown) in a manner well known to the art thereby to displace a set of corresponding parts of opposed sidewalls 43, 45 of preselected grooves 41 into overlaying or gripping engagement with confronting parts on cross walls 77 of the beams at least adjacent openings 79, 81 therein and into abutting engagement with opposite marginal edges 83, 85 on the cross walls of the beams thereby to retain the beams against displacement from the preselected assembly positions thereof with respect to the preselected grooves in the core, respectively. Upon the deformation of sections 67 in extensions 31, as discussed above, it may be noted that the displaced corresponding parts of opposed sidewalls 43, 45 are passed or moved at least in part through openings 79, 81 in opposite sidewalls 73, 75 of beams 65 into the gripping engagement with serrations 87, 89 on cross walls 77 of the beams, respectively. While core 21 is illustrated herein with each extension 31 and tooth 33 arranged in the radial alignment thereof for purposes of disclosure, it is contemplated that the core may have fewer extensions than teeth within the scope of the invention so as to meet at least some of the objects thereof. For instance, in this vein, it is contemplated that only the adjacent pairs of extensions may be provided on core 21 with the preselected grooves 41 therebetween in which beams 65 are secured against displacement from the preselected assembly positions thereof, respectively, as discussed above. As previously mentioned, extensions 31 are predeterminately arranged on pitch axis 48 of teeth 33 so as to be disposed in radially aligned relation with the teeth on core 21, and it may be noted that such predetermined arrangement thereby locates the extensions generally at the thickest and strongest radial cross section of the core to absorb the generally radially directed loads or forces exerted on the extensions when sections 67 thereof are deformed into gripping engagement with beams 65 without incurring deformation or distortion in the yoke section or the teeth of the core. While sections 67 of extensions 31 are shown displaced into the gripping engagement thereof with beams 65 for purpose of disclosure, it is contemplated that either a fewer or greater number of such sections, or the entire expanse of the extensions across core 21, may be deformed into gripping engagement with the beams within the scope of the invention so as to meet at least some of the objects thereof. Albeit not shown for purposes of drawing simplicity, it is contemplated that a fixture would be inserted into back-up engagement with the bore of the edgewise wound core upon the exertion of the forces on the extensions to secure the beams to the core, as discussed above.

As alternatively shown in FIG. 9A, sections 67a of extensions 31 may be severed therefrom by suitable tooling (not shown) well known to the art and deformed, i.e., swedged or bent, into the overlapping or gripping engagement with confronting parts on cross walls 77 of beams 65 with the section 67a extending at least in part through openings 79, 81 in opposite side walls 73, 75 of the beams, respectively, within the scope of the invention so as to meet at least some of the objects thereof.

With further reference to the drawings in general and recapitulating at least in part with respect to the foregoing, there is shown in one form of the invention stationary assembly 63 for dynamoelectric machine 23 (FIG. 1). Stationary assembly 63 includes core 21 having opposite end faces 27, 27a with circumferential portion 57 interposed therebetween and beams 65 which are associated in preselected assembly positions with the circumferential portion of the core, respectively (FIGS. 2 and 7-9). Core 21 also has a set of means, such as sections 67 or the like for instance, deformed from circumferential portion 57 of the core into gripping engagement with beams 65 for retaining the beams against displacement from the preselected assembly positions thereof, respectively (FIGS. 7-9).

Dynamoelectric machine 23 is also shown in one form of the invention and comprises stationary assembly 63 and a pair of opposite end frames 93, 93a mounted to beams 65 in spaced apart relation with opposite end faces 27, 27a of core 21 (FIGS. 1 and 2). Winding means 95 adapted for excitation is arranged on core 21, and a rotatable assembly 97 associated with the core and rotatably supported in opposite end frames 93, 93a is adapted for magnetic coupling relation with the winding means upon the excitation thereof (FIG. 2).

More particularly and with specific reference to FIGS. 1 and 2, winding means 95, such as a plurality of conductor turns or coils thereof of generally round insulated magnet wire arranged in a desired winding configuration, is disposed in slots 51 of core 21 with suitable slot insulation and slot wedges therebetween, and the winding means has a pair of opposite generally annular groupings of end turns 99, 99a thereof disposed generally about bore 59 of the core adjacent opposite end faces 27, 27a thereof, respectively.

End frames 93, 93a may be lanced or otherwise formed from a metallic sheet material, such as for instance sheet steel or the like, and it is contemplated that such formation of the end frames may be accomplished by the use of progressive dies or the like for instance (not shown). End frames 93, 93a include a pair of generally planar portions or sections 101, 101a formed so as to extend about generally central portions of the end frames which define a pair of means, such as bearing seats or seating surfaces 103, 103a or the like, for seating or bearing engagement with bearings 105, 105a, as further discussed hereinafter, and a pair of shaft receiving openings 107, 107a extend through the bearing seats, respectively. Although end frames 93, 93a are disclosed as having generally planar portions 101, 101a, the end frames may be provided with a pair of sets of means, such as for instance a plurality of ribs 109, 109a or the like, for strengthening the generally planar portions and may have passages for the passage of ambient air therethrough, respectively. Sets of apertures or generally elongate slots 111, 111a are arranged in preselected locations generally radially outwardly of the central portions of end frames 93, 93a adjacent circumferential edges 112, 112a thereof, respectively. While the construction and contiguration of end frames 93, 93a are described and illustrated herein for purposes of disclosure, it is contemplated that various other end frames having different constructions and configurations as well as being formed in different manners and of different material may be utilized within the scope of the invention so as to meet at least some of the objects thereof.

Rotatable assembly 97 includes a rotor 113 mounted to a shaft 115 between a pair of opposite shaft end portions or extensions 117, 117a for conjoint rotation therewith, and a pair of thrust devices 119, 119a are secured to the opposite shaft extensions for thrust taking or end play engagement with bearings 105, 105a of end frames 93, 93a, respectively. Rotor 113 is disposed at least in part within bore 59 of core 21 with a generally uniform air or flux gap therebetween and is arranged in magnetic coupling relation with winding means 95 of the core upon the excitation thereof when dynamoelectric machine 23 is energized across a power source (not shown). Although rotor 113 is illustrated herein for purposes of disclosure, it is contemplated that various other types of rotors, such as for instance one carrying a set of permanent magnet material elements for selective magnetic coupling engagement with winding means 95 upon the excitation thereof, may be utilized within the scope of the invention so as to meet at least some of the objects thereof. A centrifugal mechanism 121 is carried on opposite shaft extension 117 for conjoint rotation therewith, and if a more detailed discussion of the construction and operation of the centrifugal mechanism is desired, reference may be had to Steven J. Gray U.S. Pat. No. 4,208,559 issued June 17, 1980 which is incorporated herein by reference. Of course, centrifugal mechanism 121 is arranged to operate a switch assembly 123 carried on end frame 93 for controlling the excitation of winding means 95 on core 21 during the energization of dynamoelectric machine 23, as well known in the art, and if a more detailed discussion of the construction and operation of the switch assembly and the association thereof with the winding means and the end frame, reference may be had to the commonly assigned James L. King patent application Ser. No. 496,552 filed May 20, 1983 (now U.S. Pat. No. 4,594,773 issued June 17, 1986) and the commonly assigned James P. Frank and James L. King patent application Ser. No. 496,524 filed May 20, 1983 which are respectively incorporated herein by reference. Depending upon the winding configuration of winding means 95, it is, of course, contemplated that centrifugal mechanism 121 and switch assembly 123 may be omitted from dynamoelectric machine 23 within the scope of the invention so as to meet at least some of the objects thereof. Opposite shaft extensions 117, 117a extend through shaft openings 107, 107a in end frames 93, 93a and are received in journaling engagement with bearings 105, 105a arranged on bearing seats 103, 103a on the end frames, respectively. If a more detailed discussion of the construction of bearings 105, 105a and seats 103, 103a is desired, reference may be had to the Eldon R. Cunningham U.S. Pat. No. 4,409,714 issued Oct. 18, 1983 which is incorporated herein by reference. While bearings 105, 105a are illustrated herein for purposes of disclosure, it is contemplated that other types of bearings, such as for instance sleeve bearings, ball or roller bearings or bearings integral with the end frames or the like, may be utilized within the scope of the invention so as to meet at least some of the objects thereof. As previously mentioned, thrust devices 119, 119a are carried on opposite shaft extensions 117, 117a for thrust taking or end play limiting engagement with bearings 105, 105a, respectively, in a manner well known to the art.

A pair of lubrication systems 125, 125a include a pair of feeder wicks 127, 127a associated with bearings 105, 105a and arranged in lubricating engagement with opposite shaft extensions 117, 117a and a pair of lubricant storage wicking means 129, 129a arranged to contain and flow flow lubricant to the feeder wicks, respectively. Storage wicking means or material 129, 129a, may be GELUBE available from the General Electric Company Fort Wayne, Ind., and if a more detailed discussion of the composition and operation of the storage wicking material is desired, reference may be had to James A. Whitt U.S. Pat. No. 3,894,956 issued July 15, 1975 which is incorporated herein by reference. While feeder wicks 127, 127a and storage wicking material 129, 129a are illustrated herein for purposes of disclosure, it is contemplated that various other feeder and storage wicks having different shapes, formed of different materials and associated in different manners with each other and with the bearings may be utilized within the scope of the invention so as to meet at least some of the claims thereof. Oil well covers 131, 131a are secured to end frames 93, 93a generally about the central portions thereof to retain storage wicks 129, 129a in place with respect to feeder wicks 127, 127a and bearings 105, 105a, respectively; however, it is contemplated that other means may be employed with the end frames to effect the retention of the storage wick within the scope of the invention so as to meet at least some of the objects thereof.

To complete the description of dynamoelectric machine 23, a pair of sets of opposite tabs 133, 133a integrally provided on opposite end portions 71, 71a of beams 65 extend through apertures 111, 111a in end frames 93, 93a, and the tabs are deformed so as to capture the end frames between the tabs and the opposite end portions of the beams with the tabs and beams being secured together by a pair of sets of clinched joints indicated generally at 135, 135a, respectively. If a more detailed discussion of clinched joints 135, 35a and the formation of such between beams 65 and end frames 93, 93a is desired, reference may be had to the commonly assigned application Ser. No. 598,902 of James L. King and John E. Hennessy filed Apr. 10, 1984 (now U.S. Pat. No. 4,521,953 issued June 11, 1985) which is incorporated herein by reference. Further, although beams 65 and opposite end frames 93, 93a are shown herein as secured together by clinched joints 135, 135a, it is contemplated that other means may be employed for securing the end frames to the beams against displacement within the scope of the invention so as to meet at least some of the objects thereof, respectively.

With reference to FIGS. 10-14, there is shown an alternative stationary assembly 141 for dynamoelectric machine 23 and an alternative method of assembling such with the alternative stationary assembly 141 having generally the same component parts as the previously discussed stationary assembly 63 and the alternative method having generally the same steps as the method discussed hereinabove with the exceptions noted below. While alternative stationary assembly 141 and the alternative method meet at least some of the objects set out hereinbefore, it is believed that such alternative stationary assembly and method may have other indigenous objects and advantageous features which will be in part apparent and in part pointed out in the following discussion.

As best seen in FIGS. 10 and 11, another beam 143 has a base or cross wall 145 having generally the same arcuate configuration as base walls 47 of grooves 41 in core 21 of FIG. 3, and a pair of opposite marginal edges or sidewalls 147, 149 are provided on the cross wall intersecting between a pair of generally arcuate upper and base surfaces 151, 153 thereof, respectively. Beam 143 has an intermediate portion or section 155 integrally interposed between a pair of opposite end portions or sections 157, 157a thereof. Opposite tabs 133, 133a are integrally formed on opposite end portions 157, 157a of beam 143, and if desired, a set of notches 159, 161 or the like for instance may be formed in opposite marginal edges 147, 149 of the beam, respectively.

Figure 13:
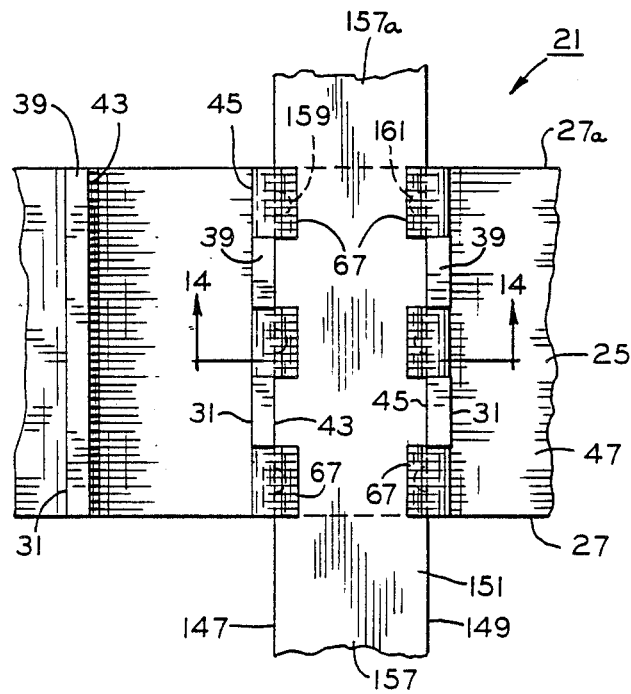
FIG. 13 is generally the same as FIG. 12 but showing sections of adjacent extensions on the core deformed into displacement preventing engagement with the alternative beam in the preselected assembly position thereof.
Figure 14:
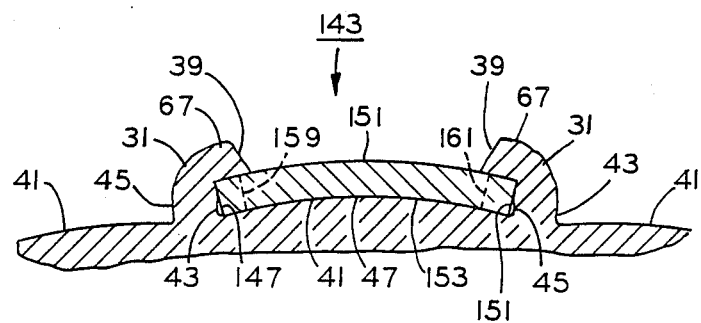
FIG. 14 is a sectional view taken along line 14—14 of FIG. 13.

To place beam 143 in an assembly position therefor with respect to core 21, as best seen in FIG. 12, lower or base surface 153 on wall 145 of the beam is seated or engaged at least in part against base wall 47 of groove 41 between a pair of adjacent ones of extensions 31 of the core, and opposite marginal edges 147, 149 of the beam are arranged in facing relation with opposed sidewalls 43, 45 of the groove at least adjacent thereto. Of course, when intermediate portion 155 of beam 143 is disposed in groove 41 of core 21, as discussed above, opposite end portions 157, 157a of the beam are projected beyond opposite end faces 27, 27a of the core, respectively. When beam 143 is so disposed in its assembly position with respect to core 21, sections 67 of the adjacent ones of extensions 31 are deformed by suitable tooling (not shown) into gripping or overlaying engagement with confronting parts of beam 143 on upper surface 151 thereof and into abutting engagement with opposite marginal edges 147, 149 of the beams thereby to retain the beam against displacement from its assembly position, respectively, as best seen in FIGS. 13 and 14. When notches 159, 161 are provided in opposite marginal edges 147, 149 of beam 143, a part of at least some of the deformed sections 67 of the adjacent ones of extensions 31 is displaced into the notches in interlocking engagement therewith thereby to at least assist in the retention of the beam against displacement from the assembly position thereof. While only one beam 143 and its assembly to core 21 is shown and described herein for purposes of drawing simplification and brevity of discussion, it is, of course, contemplated that a plurality of such beams may be secured either individually or simultaneously to core 21 within the scope of the invention so as to meet at least some of the objects thereof. To complete the discussion of stationary assembly 141, opposite tabs 133, 133a on opposite end portions 157, 157a of beams 143 may be received in apertures 111, 111a of opposite end frames 93, 93a upon the assembly of dynamoelectric machine 23, as previously discussed.

Figure 15:
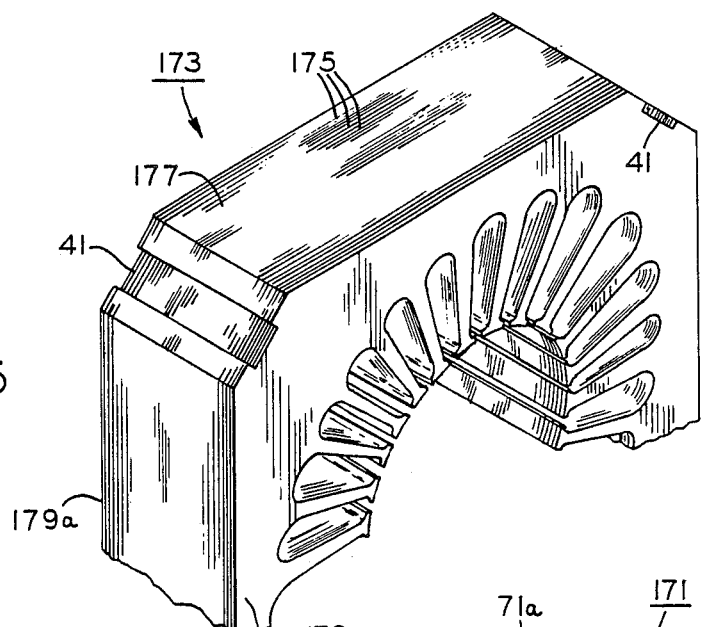
FIG. 15 is a partial perspective view of a core utilized in another alternative stationary assembly in one form of the invention for use in the dynamoelectric machine of FIG. 1.
Figure 16:
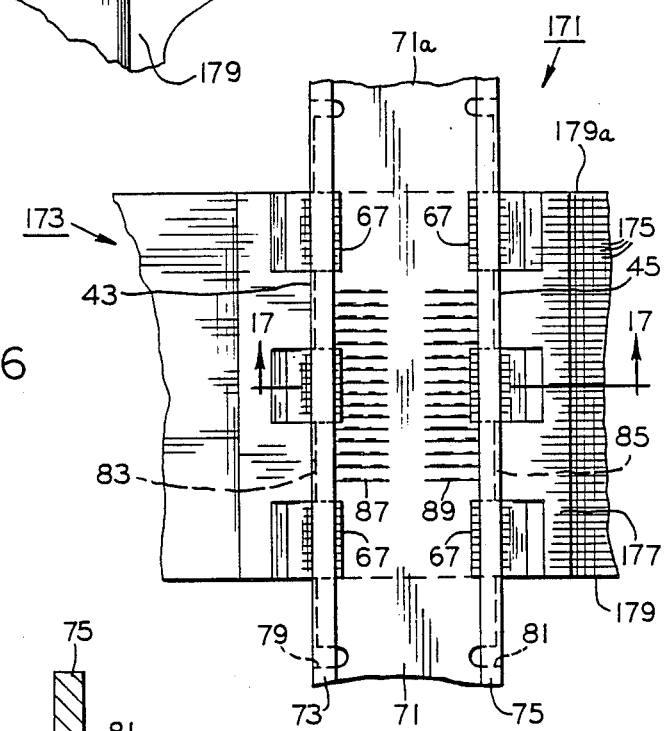
FIG. 16 is an enlarged elevational view taken from FIG. 15 and illustrating the beam of FIG. 3 associated with the core of FIG. 15 with sections deformed from the circumferential portion of the core into displacement preventing engagement with the beam in its preselected assembly position.
Figure 17:
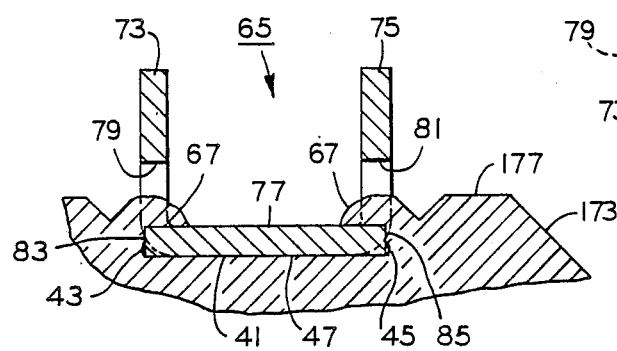
FIG. 17 is a sectional view taken along line 17—17 of FIG. 16.

While edgewise wound core 21 is shown in the embodiments of the invention discussed hereinabove for purposes of disclosure, it is contemplated that various other cores of different constructions and shapes may be utilized in dynamoelectric machine 23, and stationary assembly 63 within the scope of the invention so as to meet at least some of the objects thereof. For instance, there is shown in FIGS. 15–17 another alternative stationary assembly 171 in one form of the invention having generally the same component parts associated in generally the same manner as those of the previously discussed stationary assembly 63 with the exceptions noted below. While stationary assembly 171 meets at least some of the objects set out hereinabove, it is believed that stationary assembly 171 may have other indigenous objects and advantageous features as will be in part apparent and in part pointed out in the following discussion.

As best seen in FIG. 15, a core 173 is formed of a stack of individual laminations 175 arranged generally in face-to-face relation and having a circumferential portion or surface 177 interposed between a pair of opposite end faces 179, 179a of the core. Grooves 41 are provided in laminations 175 adjacent the corners of core 173 and are aligned generally in axial row formation so as to extend across the core between opposite end faces 159, 159a thereof, and grooves define a part of circumferential portion 177 of the core, respectively. Beams 65 may be associated in the preselected assembly positions with respect to the core 173 and retained against displacement therefrom so as to form stationary assembly 171 in the same manner as previously discussed with respect to stationary assembly 63 and as illustrated in FIGS. 16 and 17.

From the foregoing, it is now apparent that a novel core 21, a novel dynamoelectric machine 23, a novel lanced strip 25 and a novel stationary assemblies 63, 141, 171 have been presented meeting the objects set forth hereinabove as well as others, and it is contemplated that changes as to the precise arrangements, shapes, connections and details of the constructions illustrated herein by way of example for purposes of disclosure, may be made by those having ordinary skill in the art without departing from either the spirit of the invention or the scope of the invention as defined by the claims which follow.

What I claim as new and desire to secure by Letters Patent of the United States:

1. A dynamoelectric machine comprising:

a core including a lanced strip of generally thin ferromagnetic material helically wound to form said core, a pair of opposite end faces on said core defining the axial length of said helically wound lanced strip, a plurality of spaced apart teeth on said strip having tips defining in part a generally axial bore through said core between said opposite end faces thereof, a plurality of winding means receiving slots in said lanced strip between adjacent ones of said teeth with said slots having a closed end and an open end generally opposite said closed end and between adjacent ones of said tooth tips so as to communicate with said bore, said teeth and said slots being disposed generally in axial row formation between said opposite end faces of said wound core and extending generally radially of said bore, a plurality of spaced apart extension means on said strip for defining a plurality of lands and grooves therein, said extension means extending generally in axial row formation between said opposite end faces of said core and opposite said teeth generally in radial alignment therewith, and said grooves each having a wall connecting between said extension means and arranged generally opposite said closed ends of said slots in the axial row formation thereof, respectively;

winding means adapted for excitation and having opposite side turn portions received on said slots of said core and opposite end turn portions arranged in generally annular groupings adjacent said opposite end faces of said core about said bore thereof, respectively;

a set of beams mounted in preselected assembly positions with respect to said core, respectively, each of said beams including a pair of spaced apart sidewalls arranged in part at least adjacent preselected adjacent ones of said extension means in the axial row formation thereof between said opposite end faces of said core, a base wall 77 intersecting with said opposite sidewalls, a set of openings extending through said opposite sidewalls at least adjacent the intersections of said base wall with said opposite sidewalls, said base wall having a part arranged in overlaying relation with said wall of said groove and having a configuration at least in part corresponding to that of said wall of said groove, and at least one end portion on said base wall and said sidewalls extending beyond one of said opposite faces of said core, respectively;

at least one deformed section displaced from said preselected ones of said adjacent extension means on said core into gripping engagement with confronting parts on said base wall part of said beams and extending at least in part through said openings so as to retain said beams against displacement from the preselected assembly positions thereof, respectively;

at least one end frame secured to said beams at least adjacent said at least one end portion thereof beyond said one opposite end face of said core in spaced apart relation therewith; and rotatable means adapted for magnetic coupling relation with said winding means upon the excitation thereof, said rotatable means being disposed at least in part within said bore of said wound stator core and rotatably supported by at least said at least one end frame.

2. A dynamoelectric machine comprising:
at least one end frame;
a core including an edgewise and helically wound lanced strip of ferromagnetic material defining on said core a pair of opposite end faces and a yoke section therebetween a plurality of teeth and a plurality of extensions on said strip extending generally radially and oppositely from said yoke section and also generally transversely thereof between said opposite end faces, respectively, and said extensions being arranged generally in radial alignment with respective ones of said teeth;
winding means adapted for excitation associated with said core and arranged in part between said teeth thereof, respectively;
a set of means mounted to said core in preselected assembly positions between sets of adjacent ones of said extensions for supporting said at least one end frame generally in spaced apart relation with one of said opposite end faces of said core, respectively; and
a rotatable assembly associated with said wound stator core and rotatably supported at least by said at least one end frame.

3. The dynamoelectric machine as set forth in claim 2 wherein said core further includes a set of preselected pitch axes, said teeth and said extensions spanning the preselected pitch axes, respectively.

4. The dynamoelectric machine as set forth in claim 2 wherein said core further includes at least one deformed section displaced from each of said adjacent ones of said extensions into engagement with said supporting means to retain said supporting means against displacement from the preselected assembly positions thereof, respectively.

5. The dynamoelectric machine as set forth in claim 4 wherein each supporting means includes at least a pair of generally opposite openings, said at least one deformed sections extending at least in part through respective ones of said opposite openings.

6. A dynamoelectric machine comprising:
at least one end frame;
a core including a pair of generally opposite end faces, a circumferential portion on said core between said opposite end faces, a plurality of teeth extending between said opposite end faces and defining at least in part a bore through said core, a plurality of winding receiving slots between adjacent ones of said teeth, and a set of grooves in said circumferential portion of said core with at least some of said grooves being arranged generally in radial alignment with respective ones of said winding receiving slots, respectively;

a set of beams each having at least an undeformed section disposed at least in part within said at least some grooves in preselected assembly positions and having at least another section extending beyond one of said opposite end faces of said core into mounting association with said at least one end frame, respectively;

said core further including a plurality of sets of deformed means at least adjacent said circumferential portion and said at least some grooves arranged in gripping engagement with confronting parts of said at least undeformed sections on said beams for retaining said beams against displacement from the preselected assembly positions thereof, respectively; and a rotatable assembly associated with said core and rotatably supported at least in said at least one end frame.

7. The dynamoelectric machine as set forth in claim 6 wherein said core further includes a plurality of extensions on said circumferential portion defining in part said groove means and arranged generally in radial alignment with said teeth, said deformed means being deformed from adjacent ones of said extensions defining in part said at least some groove means, respectively.

8. The dynamoelectric machine as set forth in claim 6 wherein said grooves each include a wall disposed at least adjacent said circumferential portion of said core and having a preselected configuration, and at least said undeformed sections of said beams each including another wall having a configuration at least in part similar to the preselected configuration of said first named wall and overlaying at least in part a respective one of said first named walls.

9. A core for a dynamoelectric machine comprising:
a lanced strip of generally thin ferromagnetic material having a pair of opposite edges with said strip being edgewise and helically wound into said core, a pair of opposite end faces on said helically wound lanced strip defining the axial length of said core, a plurality of spaced apart teeth on said helically wound lanced strip having tips at least generally coterminous with one of said opposite edges of said helically wound lanced strip and defining in part a generally axial bore through said core between said opposite end faces thereof, a plurality of winding means receiving slots in said helically wound lanced strip between adjacent ones of said teeth with said slots having a closed end spaced from the other of said opposite edges of said helically wound lanced strip and an open end intersecting with said one opposite edge generally between adjacent ones of said tooth tips so as to communicate with said bore, said teeth and said slots being disposed generally in axial row formation between said opposite end faces of said core and extending generally radially of said bore thereof, a plurality of spaced apart extensions on said helically wound lanced strip having a plurality of lands thereon, and a plurality of grooves in said helically wound lanced strip between said lands, said extensions extending generally in axial row formation between said opposite end faces of said core and opposite said teeth generally in radial alignment therewith, and said grooves each having a wall connecting between said extensions and arranged generally opposite said closed ends of said slots in the axial row formation thereof, respectively.

10. A core for a dynamoelectric machine comprising: a helically wound lanced strip of generally thin ferromagnetic material having a pair of opposite edges, a pair of opposite end faces on said helically wound lanced strip defining the axial extent of the core, a plurality of lands on one of said opposite edges and a plurality of grooves in said one opposite edge between said lands and extending generally in axial row formation between said opposite end faces, a plurality of winding means receiving slots in said strip having an open end intersecting with the other of said opposite edges and a closed end generally opposite said grooves, and a plurality of teeth on said strip between said slots, said slots and said teeth extending generally in axial row formation between said opposite end faces and said lands being arranged generally in radial alignment with said teeth, respectively.

11. The core as set forth in claim 10 wherein said lands and said teeth span a set of preselected pitch axes, respectively.

12. A core for a dynamoelectric machine comprising: a helically wound lanced strip of generally thin ferromagnetic material having a pair of opposite end faces and defining therebetween a yoke section, a plurality of teeth and a plurality of extensions on said strip extending generally oppositely and radially from said yoke section and also generally transversely thereof between said opposite end faces, respectively, and said extensions being arranged generally in radial alignment with respective ones of said teeth.

13. The core as set forth in claim 12 wherein said extension and said teeth are disposed about a set of preselected pitch axes, respectively.

14. The core as set forth in claim 13 wherein said winding means receiving slots and said grooves are spaced between respective adjacent ones of the preselected pitch axes.

15. A stationary assembly for a dynamoelectric machine comprising:
a core including an edgewise wound strip of generally thin ferromagnetic material having a pair of generally opposite edges, a pair of opposite end faces on said core defined by a pair of leading and trailing end portions of said strip, a plurality of spaced apart teeth on said strip each having a tip at least generally coterminous with one of said opposite edges, said tooth tips defining in part a generally axial bore through said core between said opposite end faces, a plurality of winding means receiving slots in said strips between said teeth, respectively, said slots each having a closed end spaced from the other of said opposite edges and an open end intersecting with said one opposite edge generally between adjacent tooth tips so as to communicate with said bore, said teeth and said slots being disposed generally in axial row formations between said opposite end faces and extending generally radially of said bore, respectively, a plurality of spaced apart extensions on said strip and defining a plurality of lands at least generally coterminous with said other opposite edge, a plurality of grooves in said strip between said lands, respectively, said extensions extending generally in axial row formations between said opposite end faces and opposite said teeth generally in radial alignment therewith, and said grooves having at least one wall interposed between said extensions with said at least one wall being arranged generally radially opposite said closed ends of said slots, respectively;
a set of beams mounted in preselected assembly positions to said core, respectively, said beams each including a pair of spaced apart sidewalls arranged at least in part at least adjacent preselected adjacent ones of said extensions between said opposite end faces, a base wall intersecting said opposite sidewalls, at least one opening in said opposite sidewalls at least adjacent the intersections of said base wall with said opposite sidewalls, each base wall at least in part being arranged in overlaying relation with said at least one wall between said preselected ones of said adjacent extensions and having a configuration at least in part corresponding to that of said at least one wall, and a pair of opposite end portions on said beams extending beyond said opposite end faces, respectively; and
said preselected ones of said adjacent extensions each having at least one deformed section displaced into engagement with a confronting part on said base walls of said beams and extending at least in part through respective ones of said at least one openings thereby to retain said beams against displacement from their preselected assembly positions, respectively.

16. A stationary assembly for a dynamoelectric machine comprising:
a core including an edgewise and helically wound strip of ferromagnetic material having a pair of opposite end faces, a plurality of lands and a plurality of teeth disposed generally in opposite relation on said strip and in row formation between said opposite end faces, said lands also being arranged generally in radial alignment with respective ones of said teeth, and a plurality of grooves in said strip between said lands and extending generally in row formation between said opposite end faces, respectively;
a set of beams on said core disposed in preselected assembly positions at least in part within preselected ones of said grooves between preselected adjacent ones of said lands, respectively; and
said core further including a set of sections deformed from said preselected adjacent ones of said lands into gripping engagement with confronting parts of said beams so as to retain said beams against displacement from the preselected assembly positions thereof, respectively.

17. The stationary assembly as set forth in claim 16 wherein said beams each include an undeformed section disposed at least in part within said preselected ones of said grooves, and said deformed sections being in the gripping engagement with said undeformed sections, respectively.

18. The stationary assembly as set forth in claim 16 wherein said beams each include a pair of generally opposite sidewalls, a base wall intersecting with said opposite sidewalls and seated at least in part on said core within one of said preselected ones of said grooves, and at least one opening in each of said opposite sidewalls, said sections extending at least in part through said at least one opening in said opposite sidewalls into the gripping engagement with said confronting parts of said beams located on said base walls, respectively.

19. The stationary assembly as set forth in claim 16 wherein said teeth and said lands span across a set of preselected pitch axes of said core, respectively.

20. A stationary assembly for a dynamoelectric machine comprising:
a core including a circumferential portion interposed between a pair of opposite end faces on said core, a plurality of teeth defining at least in part a bore through said core between said opposite end faces and disposed about a set of preselected pitch axes, and a set of grooves in said circumferential portion disposed between at least some adjacent ones of the preselected pitch axes, respectively;
a set of beams each having an undeformed section disposed at least in part within one of said grooves in a preselected assembly position with respect to said core; and
said core further including a set of means deformed from said circumferential portion of said core into gripping engagement with confronting parts of said undeformed sections of said beams for retaining said beams against displacement from the preselected assembly positions thereof, respectively.

21. An edgewise wound core for a dynamoelectric machine comprising:
a generally annular yoke section having a preselected length along a centerline axis of the core and including a plurality of teeth disposed on preselected pitch axes, and a plurality of extensions, said teeth and said extensions being arranged generally in axial row formation across the preselected length of said yoke section and extending generally in opposite directions from said yoke section with said extensions being disposed on the preselected pitch axes of at least some of said teeth, respectively, and the radial dimension of the core between the centerline axis thereof and a respective one of said extensions being greater than any other radial dimension of the core.

22. A core as set forth in claim 21 further comprising a lanced strip of generally thin ferromagnetic material wound into a stack of helical convolutions thereof defining said yoke section with said teeth and extensions thereon, respectively.

23. A core as set forth in claim 21 wherein the width of said extensions is no greater than the width of said teeth.

24. A core as set forth in claim 21 wherein said yoke section includes a circumferential surface on the core extending generally across the preselected length of said yoke section, and at least a part of at least some of said extensions extending from said yoke section beyond said circumferential surface.

25. An edgewise wound core for a dynamoelectric machine comprising:
a generally annular yoke section having a preselected axial length and defining an interrupted circumferential surface generally about the core, said yoke section including a plurality of teeth disposed on preselected pitch axes and defining in part a generally axial bore through the core, a plurality of extensions each having at least a part thereof extending beyond said circumferential surface, said teeth and said extensions being arranged generally in axial row formation across the core with said extensions being disposed on the preselected pitch axes of at least some of said teeth, respectively.

26. A core as set forth in claim 25 further comprising a lanced strip of generally thin ferromagnetic material wound into a stack of helical convolutions thereof and defining said yoke section, said teeth and said extensions.

27. A core as set forth in claim 25 wherein the width of said extensions is no greater than the width of said teeth.

28. The core as set forth in claim 25 wherein the thickest radial cross-sectional portion of the core extend across said teeth and said extensions at least generally at the preselected pitch axes, respectively.

29. The core as set forth in claim 25 wherein the radial dimension of the core between the centerline axis of said bore and a respective one of said extensions is greater than any other radial dimension of the core.

30. A lanced strip of generally thin ferromagnetic material adapted to be helically wound into a core for a dynamoelectric machine comprising:
a continuous yoke section on said lanced strip extending generally lengthwise thereof and including a plurality of sets of generally arcuate inner and outer edges;
a plurality of teeth on said lanced strip and integrally formed with said yoke section generally between adjacent ones of said arcuate inner edges thereon, said teeth being generally aligned about a plurality of preselected pitch axes therefor so as to extend generally laterally of said yoke section, said teeth including a plurality of free ends defining tip sections thereof, respectively; and
a plurality of extensions on said lanced strip and integrally formed with said yoke section between at least some of the adjacent ones of said arcuate outer edges thereon, said extensions extending from said yoke section in a direction opposite at least some of said teeth and being generally aligned about the preselected pitch axes thereof, and said extensions including a plurality of lands thereon with at least some of said lands being spaced beyond said arcuate outer edges on said yoke section, respectively.

31. A lanced strip of a generally thin ferromagnetic material adapted to be edgewise wound into a core for a dynamoelectric machine, the lanced strip comprising:
a continuous yoke section on said lanced strip and extending generally longitudinally thereof;
a plurality of teeth on said lanced strip aligned about a plurality of generally parallel and equidistantly spaced apart pitch axes therefor and extending generally laterally from said yoke section, respectively; and
a plurality of extensions on said lanced strip aligned about the pitch axes of said teeth and extending generally laterally from said yoke section in a direction generally opposite said teeth, respectively.

32. A lanced strip of generally thin ferromagnetic material adapted to be edgewise wound into a core for a dynamoelectric machine, the lanced strip comprising:
a continuous yoke section on said lanced strip and extending generally lengthwise thereof;

a plurality of teeth on said lanced strip having preselected pitch axes and extending generally laterally from said yoke section, respectively; and a plurality of extensions on said lanced strip extending generally laterally from said yoke section on the preselected pitch axes of the teeth and opposite thereto, respectively.

33. A dynamoelectric machine comprising:

at least one end frame;

a core including a pair of generally opposite end faces, a set of extensions and a set of teeth extending generally radially opposite each other about a set of preselected pitch axes and disposed in row formations between said opposite end faces, respectively;

winding means on said core adapted for excitation and associated with at least some of said teeth;

a set of means for supporting at least said at least one end frame in spaced relation with one of said opposite end faces, said supporting means each including an undeformed section disposed at least in part in a preselected assembly position on said core between at lest some adjacent ones of said extensions, and said at least some adjacent ones of said extensions being deformed at least in part into displacement preventing engagement with said undeformed sections thereby to retain said undeformed sections in their preselected assembly positions, respectively; and rotatable means associated with said core for magnetic coupling relation with said winding means upon the excitation thereof and rotatably supported at least by said at least one end frame.

34. The dynamoelectric machine as set forth in claim 33 wherein said core further includes a set of grooves defined between at least said at least some adjacent ones of said extensions and extending in row formations between said opposite end faces, said undeformed sections being arranged at least in part in said grooves, respectively.

35. The dynamoelectric machine as set forth in claim 34 wherein said grooves each includes a base wall having a preselected configuration, and at least said undeformed sections of said supporting means each including another wall at least in part having a configuration at least similar to the preselected configuration of said base walls and at least in part overlaying a respective one of said base walls.

36. The dynamoelectric machine as set forth in claim 34 wherein at least said undeformed sections each includes a base wall seated at least in part against said core within one of said grooves, a pair of opposite sidewalls integral with said base wall, and at least one opening in each of said opposite sidewalls, said at least some adjacent ones of said extensions protruding at least in part into said at least one opening in said opposed sidewalls into the displacement preventing engagement with said base wall.

37. The dynamoelectric machine as set forth in claim 33 wherein said at least some adjacent ones of said extensions each include at least one section deformed therefrom into the displacement preventing engagement with said undeformed section.

38. The dynamoelectric machine as set forth in claim 33 wherein the greatest radial cross-section of said core is defined across said teeth and said extensions at least generally at the preselected pitch axes.

39. A stationary assembly for a dynamoelectric machine comprising:

a core including a pair of generally opposite end faces, a set of teeth disposed about a set of preselected pitch axes, and a set of extensions extending generally radially opposite at least some of said teeth on at least some of the preselected pitch axes, said teeth and said extensions being arranged in row formations between said opposite end faces, respectively; and a set of beams disposed in preselected assembly position on said core between adjacent ones of at least some of said extensions and with said adjacent ones of said at least some extensions being at least in part deformed into engagement with said beams thereby to retain said beams against displacement from the preselected assembly positions thereof, respectively.

40. The stationary assembly as set forth in claim 39 wherein said beams include a set of undeformed sections disposed at least in part on said core in the preselected assembly positions of said beams, said deformed parts of said adjacent ones of said at least some extensions being engaged with said undeformed sections, respectively.

41. The stationary assembly as set forth in claim 39 wherein said adjacent ones of said at least some extensions each include at least one deformed section displaced therefrom into engagement with a respective one of said beams.

42. The stationary assembly as set forth in claim 39 wherein said core further includes a set of grooves interposed between at least said adjacent ones of said at least some extensions, said beams in the preselected assembly position thereof being disposed in said grooves, respectively.

43. The stationary assembly as set forth in claim 42 wherein said grooves include a set of base walls having a preselected configuration of said base walls, and said beams including a set of undeformed walls having a configuration at least similar to the preselected configurations of said base walls and arranged at least in part generally in overlaying relation with said base walls, respectively.

44. The stationary assembly as set forth in claim 39 wherein said beams each include a set of walls, at least one opening in some of said walls, and another of said walls being disposed at least in part in overlaying relation with said core between said adjacent ones of said at least some extensions, said deformed parts of said adjacent ones of said at least some extensions extending at least in part through said at least one opening in said some walls into the engagement with said one walls, respectively.

* * * * *